(12) United States Patent
Alattar et al.

(10) Patent No.: US 7,020,304 B2
(45) Date of Patent: Mar. 28, 2006

(54) DIGITAL WATERMARKING AND FINGERPRINTING INCLUDING SYNCHRONIZATION, LAYERING, VERSION CONTROL, AND COMPRESSED EMBEDDING

(75) Inventors: Adnan M. Alattar, Tigard, OR (US); Kenneth L. Levy, Stevenson, WA (US); Reed R. Stager, Portland, OR (US); Geoffrey B. Rhoads, West Linn, OR (US); Eric E. Ellingson, McMinnville, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 10/350,276

(22) Filed: Jan. 22, 2003

(65) Prior Publication Data
US 2003/0185417 A1 Oct. 2, 2003

Related U.S. Application Data

(60) Provisional application No. 60/428,485, filed on Nov. 21, 2002, provisional application No. 60/404,038, filed on Aug. 15, 2002, and provisional application No. 60/351,565, filed on Jan. 22, 2002.

(51) Int. Cl.
*G06K 9/00* (2006.01)

(52) U.S. Cl. ..................................... 382/100

(58) Field of Classification Search .................. 382/100, 382/232; 380/210, 287; 370/522, 527, 529; 348/460, 461; 386/94; 704/200.1; 381/73.1; 283/72; 399/366; 705/57, 58; 358/3.28; 713/176
See application file for complete search history.

(56) References Cited

U.S. PATENT DOCUMENTS

| 5,526,427 A | | 6/1996 | Thomas et al. |
| 5,606,609 A | * | 2/1997 | Houser et al. ............... 713/179 |
| 5,905,800 A | * | 5/1999 | Moskowitz et al. ........... 380/28 |
| 5,963,909 A | | 10/1999 | Warren et al. ................. 705/1 |

(Continued)

FOREIGN PATENT DOCUMENTS

| EP | 1223742 A1 * | 7/2002 |
| WO | WO 161508 | 8/2001 |
| WO | WO02/19589 | 3/2002 |

OTHER PUBLICATIONS

Craver et al., "Can Invisible Watermarks Resolve Rightful Ownerships?" IBM Technical Report RC 20509, Jul. 25, 1996, pp 1–21. (also published Proc. SPIE—Int. Soc. Opt. Eng. vol. 3022, pp. 310–321, conf. Feb. 13–14, 1997).

Zhao, "A WWW Service to Embed and Prove Digital Copyright Watermarks," In Proc. of the European Conf. on Multimedia Applications, Services and Techniques, Louvain–La–Neuve, Belgium, May 1996, 14 pages.

U.S. Appl. No. 09/636,102, Ramos et al, filed Aug. 10, 2000.

*Primary Examiner*—Andrew W. Johns
*Assistant Examiner*—Shervin Nakhjavan
(74) *Attorney, Agent, or Firm*—Digimarc Corporation

(57) ABSTRACT

This disclosure describes several video watermarking and fingerprinting enhancements. These enhancements include synchronizing watermark detectors with one-dimensional calibration signals, layering digital watermarks, watermarks for version control, compressed domain watermarking, watermarking of video object layers, key channel watermark embedding for video, robust fingerprinting of video and watermarking of scalable video.

19 Claims, 7 Drawing Sheets

U.S. PATENT DOCUMENTS

| | | | |
|---|---|---|---|
| 6,073,140 A * | 6/2000 | Morgan et al. ............. 707/203 |
| 6,122,403 A | 9/2000 | Rhoads ...................... 382/233 |
| 6,141,753 A * | 10/2000 | Zhao et al. ................. 713/176 |
| 6,233,684 B1 | 5/2001 | Stefik et al. ................ 713/176 |
| 6,246,775 B1 * | 6/2001 | Nakamura et al. .......... 382/100 |
| 6,272,634 B1 | 8/2001 | Tewfik et al. ............... 713/176 |
| 6,425,081 B1 | 7/2002 | Iwamura ..................... 713/176 |
| 6,430,301 B1 * | 8/2002 | Petrovic ..................... 382/100 |
| 6,449,367 B1 | 9/2002 | Van Wie et al. ............ 380/232 |
| 6,456,726 B1 | 9/2002 | Yu et al. ..................... 382/100 |
| 6,505,223 B1 * | 1/2003 | Haitsma et al. ............. 708/403 |
| 6,560,349 B1 | 5/2003 | Rhoads ...................... 382/100 |
| 6,580,806 B1 * | 6/2003 | Sato ........................... 382/100 |
| 6,662,198 B1 * | 12/2003 | Satyanarayanan et al. .. 707/204 |
| 6,674,876 B1 * | 1/2004 | Hannigan et al. ........... 382/100 |
| 6,871,180 B1 | 3/2005 | Neuhauser et al. |
| 2001/0047478 A1 | 11/2001 | Mase ......................... 713/176 |
| 2002/0059580 A1 * | 5/2002 | Kalker et al. ................. 725/25 |
| 2002/0097873 A1 | 7/2002 | Petrovic ..................... 380/238 |
| 2002/0122567 A1 | 9/2002 | Kuzmich et al. ........... 382/100 |
| 2002/0181732 A1 | 12/2002 | Safavi-Naini et al. ...... 382/100 |
| 2003/0009669 A1 | 1/2003 | White et al. ................ 713/176 |
| 2003/0112974 A1 | 6/2003 | Levy |

* cited by examiner

DIGITAL WATERMARKING AND FINGERPRINTING INCLUDING SYNCHRONIZATION, LAYERING, VERSION CONTROL, AND COMPRESSED EMBEDDING

RELATED APPLICATION DATA

This application claims the benefit of U.S. Provisional Application Nos. 60/351,565, filed Jan. 22, 2002, 60/404,038, filed Aug. 15, 2002, and 60/428,485, filed Nov. 21, 2002, which are each herein incorporated by reference.

TECHNICAL FIELD

The invention relates to digital watermarking and fingerprinting.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 6,122,403, which are herein incorporated by reference.

This document discloses a variety of inventive methods, systems and related software and hardware for digital watermarking and fingerprinting. One aspect of the invention is a method of detecting a digital watermark. This method transforms video data into a one dimensional video signal, performs calibration of the one dimensional signal with a one dimensional calibration signal to compensate for geometric distortion of the video signal.

Another aspect of the invention is a method of digitally watermarking a media signal with watermark layers at different times. This method receives a host media signal, and analyzes the host signal for presence of an embedded digital watermark. Based on analyzing the host signal, it identifies embedded portions of the host media signal that carry at least a first layer of an embedded digital watermark and available portions that do not carry an embedded digital watermark. The method embeds a second or subsequent layer of an embedded digital watermark in the available portions.

Another aspect of the invention is a method of detecting content flags embedded in a host media signal. The method detects a calibration watermark signal in the host media signal, and determines a content flag associated with the calibration signal.

Another aspect of the invention is a method for video watermarking. This method receives video comprised of two or more video object layers. It separately embeds digital watermarks in each video layer, including embedding a digital watermark with synchronization attributes used to synchronize each of the video layers. The method forms a compressed bit stream comprised of bit streams for each of the watermarked video layers.

Another aspect of the invention is a method for detecting a digital watermark in a video signal comprised of video object layers. The method detects a master synchronization signal in the video signal. The method uses the master synchronization to calibrate detection of watermarks embedded in two or more different video object layers.

Another aspect of the invention is a method of embedding auxiliary data in a compressed data stream. This method provides an auxiliary data stream to be embedded in the compressed data stream, and selects a sequence of prediction mode parameters to represent data in the compressed data stream such that the prediction mode parameter sequence corresponds to auxiliary symbols of the auxiliary data stream.

Another aspect of the invention is a method of extracting an auxiliary data stream from a compressed data stream. This method reads parameters identifying a prediction mode of data in the compressed data stream, and extracts the auxiliary data by translating the parameters into auxiliary data symbols that correspond to the parameters.

Another aspect of the invention is a method for video watermarking in scalable video. This method generates a digital watermark signal. It maps the digital watermark signal to sample locations at different resolutions in the scalable video. The method repeatedly embeds a digital watermark in the video at the different resolutions.

Another aspect of the invention is a method of video fingerprinting. This method computes statistics for video frames, it then forms a fingerprint of the video as a change in the statistics over the video frames.

Another aspect of the invention is a method for detecting a digital watermark in a compressed video signal. This method parses the compressed video signal to extract DCT coefficients, and performs a combined inverse DCT and watermark demodulation operation on the DCT coefficients.

Another aspect of the invention is a method of embedding a digital watermark in a video stream. This method generates a digital watermark signal, and stores the digital watermark signal in a key channel. The method superimposes the digital watermark on video data through a key channel combiner.

Further features will become apparent with reference to the following detailed description and accompanying drawing.

DETAILED DESCRIPTION

Efficient 1-D and 2-D Calibration Signals for Digital Watermarking

In a variety of digital watermark applications, it is necessary to synchronize the watermark detector before extracting a watermark message payload embedded in an image, video or audio signal. The process of synchronizing the detector typically includes compensating for geometric and/or temporal distortions, as well as finding the origin and/or end of the watermark signal.

The degree of calibration required to synchronize the detector depends on the application, and specifically, the expected types of geometric or temporal distortion for that application. For example, in many video applications, frames of video may be re-sized horizontally and vertically (e.g., by aspect ratio changes), but not be subject to rotation. Other applications may be subject to rotation, but only in small amounts. As such, the detector need only compensate for aspect ratio changes, and perhaps no rotation or only small amounts of rotation.

In other applications, the detector may only have access to a small arbitrary clip of video or audio, and therefore, it needs to determine the origin of the watermark signal in that clip.

There are two ways to deal with these forms of geometric and temporal distortion and mis-registration: embed the watermark so that it is detectable notwithstanding the distortion, or include a calibration component of the watermark signal to synchronize the watermark reader.

One efficient type of video watermark signal that enables synchronization despite spatial scaling is a 1-dimensional calibration signal comprised of impulse functions at predetermined locations in the Fourier transform domain. The impulse functions preferably have pseudo-random phase relative to each other, and are added to the host video signal after being perceptually adapted to the host signal. One way to perceptually adapt the calibration signal to the host signal is to calculate the data hiding capability of the host either in the spatial or frequency domain (or both) and scale the calibration signal according to the data hiding capability of the host.

Figure 1:
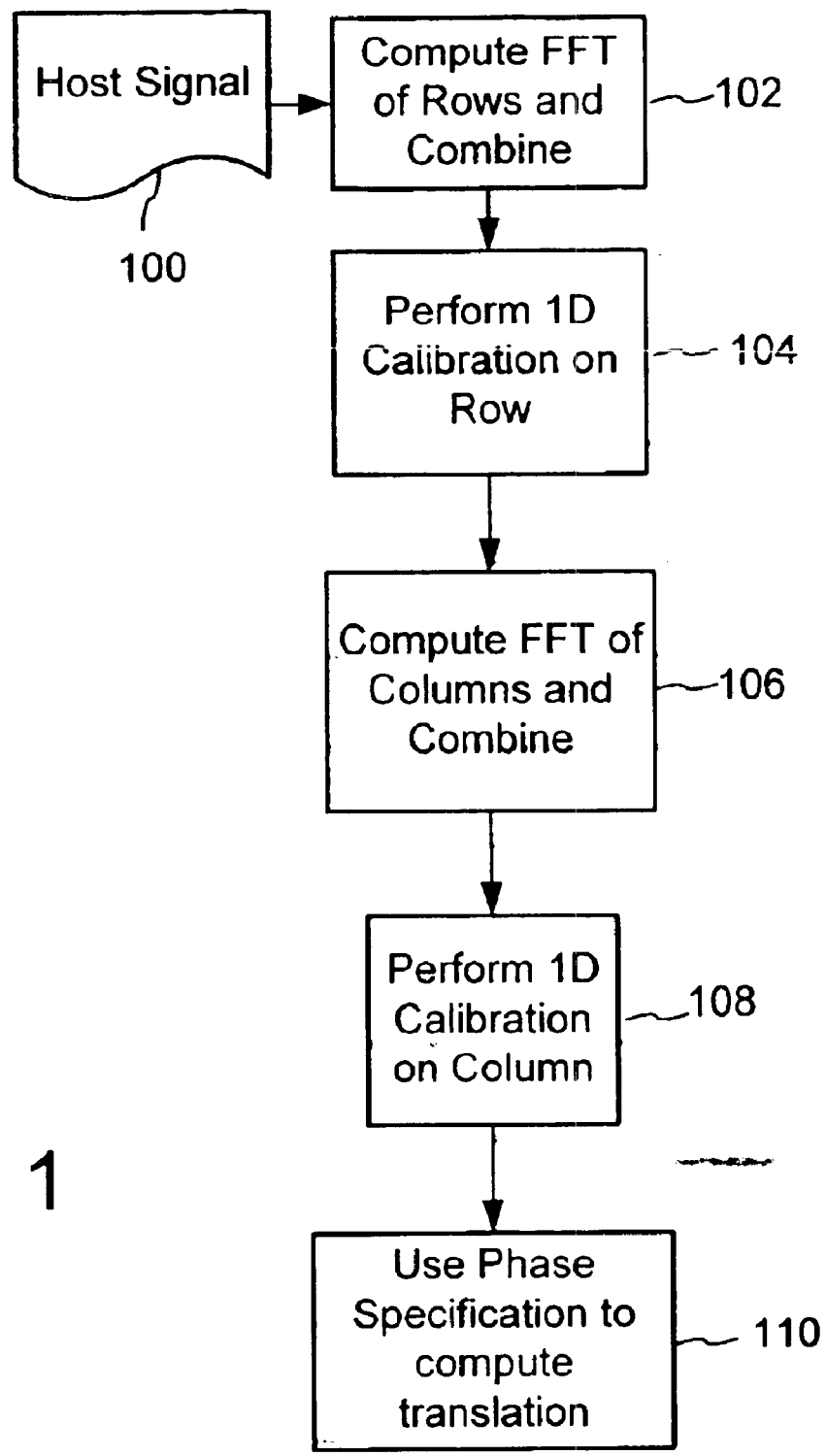
FIG. 1 is a flow diagram illustrating a method for detecting one-dimensional calibration signals in a host signal and using them to compute geometric distortion.

FIG. 1 is a flow diagram illustrating a method for detecting a calibration signal in a host video signal (100). To detect the calibration signal, the detector performs Fast Fourier Transforms (FFT) on each row, and sums the magnitudes of corresponding elements of the FFT (102). The summed signal should exhibit peaks corresponding to the locations of the impulse functions of the calibrations signal in the spatial frequency domain. The shift of these peaks relative to the location of the impulse functions in the calibration signal provides the horizontal scale distortion. By converting the frequency to a log coordinate system, the changes in scale can be represented as linear shifts along the log axis. This enables faster linear correlation, such as a dot product, to compute the scale parameter (104).

The same approach can be used to determine vertical scaling (106, 108). If the calibration signal is defined and embedded in two dimensions, this approach can be applied to both the rows and columns of an image or frames of video to compute spatial scaling in the horizontal and vertical directions.

If translation distortion is expected due to clipping or other mis-registration, the phase specification of the calibration signal may be used to detect the watermark origin (110). For example, the phase specification may be correlated with the watermarked image to detect the maximum correlation peak, which provides the origin of the digital watermark.

While the above technique specifically applies to calibration signals that produce a peak in the Fourier domain, the calibration signal can be designed to exhibit a peak in some other transform domain. The transform domain may even be covert, such that a particular key is needed to map the signal data into that covert transform domain.

The embodiment of this technique where only a 1D signal is embedded can be applied to audio signals, where temporal distortion such as time scaling, is computed based on a set of impulse functions in the frequency domain. The two dimensional extension of the method applies to audio represented as a two dimensional spectrogram, where time is represented along one axis and frequency along another axis as described in U.S. patent application Ser. No. 09/661,900 (now U.S. Pat. No. 6,674,876), which is herein incorporated by reference.

After determining scale, the detector can compensate for the scale changes and then proceed to extract the digital watermark message, which may be embedded and read using any number of watermark embedding and corresponding reading functions, such as those described in the patent documents incorporated by reference.

The calibration signal itself may carry one or more message symbols. For example, the calibration signal may be selected from a set of possible calibration signals, each corresponding to a binary or M-ary message. To convey a desired message or messages, the embedder selects the appropriate calibration signal(s).

The above calibration signal techniques can be extended further to compute rotation as well as scale of image and video frames. Assuming that the rotation and scale distortion is small or confined to a limited, discrete set of possible values, the watermark detector may use a combination of parameter searching and correlation to find the rotation and scale parameters.

The scale and rotation of a two-dimensional (x,y) image signal can be expressed as follows:

$$\begin{bmatrix} x' \\ y' \end{bmatrix} = \begin{bmatrix} a\cos\theta & -a\sin\theta \\ b\sin\theta & b\cos\theta \end{bmatrix} \begin{bmatrix} x \\ y \end{bmatrix}$$

A general expression for one impulse function in a calibration signal in the form of a cosine wave is:

$$f(x,y) = \cos(\omega_x x + \omega_y y + \alpha);$$

where $\omega_x$ and $\omega_y$ represent the location in the spatial frequency domain of the peak of the impulse function and $\alpha$ is the phase. A calibration signal may be comprised of a collection of these impulse functions, each having pseudo-random phase with respect to the other.

Now substituting the equations for x and y from the expression for the scale and rotation distortion, the effect of rotation and scale distortion on the impulse function can be written as:

$$f(x', y') = \cos[(a\cos\theta_x - a\sin\theta_y)\omega_x = +(b\sin\theta_x + b\cos\theta_y)\varpi_y + \alpha]$$
$$= \cos[(a\omega_x\cos\theta + b\omega_y\sin\theta)x + (-a\omega_x\sin\theta + b\omega_y\cos\theta)y + \alpha]$$

Averaging the magnitude of the FFT of the rows improves SNR of the calibration watermark signal relative to the host signal without affecting the horizontal location of the calibration signal peaks in the frequency domain. The expected locations of these peaks will be:

$$a\omega_x \cos\theta + b\omega_y \sin\theta$$

Similarly, averaging the magnitude of the FFT of the columns improves SNR without altering the vertical locations of the calibration signal peaks in the frequency domain. The expected location of these peaks will be:

$$-a\omega_x \cos\theta + b\omega_y \cos\theta$$

Hence, for small scales and rotations, a, b, and θ can be determined using a search for these parameters that maximizes correlation between the frequency domain of the watermarked signal and the calibrations signal. In the search process, trial values for a, b, and θ that differ slightly or fall at predetermined values relative to the original orientation state of the calibration signal are inserted in the above expressions for the peak locations of each impulse function. This provides a new, trial orientation of a reference calibration signal, which is correlated with the received signal. In particular, this reference calibration signal is correlated with the signal representing the summation of the FFT magnitudes for the rows, and separately for the columns. The parameters that provide the highest correlation are used to compensate for geometric distortion of the received signal before extracting watermark message symbols.

A routine for finding these parameters is set forth below:

```
MagPFT_x = 0
for i=1, Num Row;
    MagFFT_x = abs(FFT(Image(i, j))) + MagFFTx
End
for j=1, Num Col;
    MagFFT_y = abs(FFT(Image(i,j))) + MagFFTy
End
PrevMaxRow = PrevMaxCol = 10000000
    a_x=b_x=θ_x=0, a_y=b_y=θ_y=0
    for amin ≤ a ≤ amax
        for bmin ≤ b ≤ bmax
            for θmin ≤ θ ≤ θmax
                Gridx = calculate Grid Row(a,b,θ)
                Gridy = calculated Grid Col(a,b,θ)
                MaxRows = Max(correlate (Grid_x,MagFFT_x)
                MaxCols = Max (correlate (Grid_x,MagFFT_y)
                if (MaxRows > PrevMaxRow)
                    PrevMaxRows = MaxRows
                    a_x=a, b_x=b, θ_x = θ
                End
                if (MaxCols>PrevMaxCols)
                    PrevMaxCols = MaxCols
                    a_y=a, b_y=b, θ_y = θ
                End
            End
        End
End
```

Time Interleaving of Video and Audio Watermarks

For some digital watermark applications, it is necessary to embed several different watermark messages into a media content item at different times during the distribution of that item. For example, in the distribution of video, one may wish to embed information about various entities in the distribution chain, such as the producer or source, the distributor (e.g., cable operator or network affiliate), and the consumer. Multiple watermarks can be embedded while avoiding interference among the watermarks by interleaving the watermarks assigned to each entity in time.

We discussed interleaving of digital watermarks in media objects in U.S. patent application Ser. Nos. 60/191,778, and 09/636,102, by Rhoads, Ramos and Jones, which are each herein incorporated by reference. We noted that a media object may contain two or more watermarks or watermark messages, each associated with a distinct set of information or actions. For example, the media object may contain a creator ID, a distributor ID, etc. that link to information about the creator and distributor, respectively. Each independent watermark may be defined through a different protocol, which is used to encode a different watermark message (e.g., different watermark links for a creator, distributor, user, etc. of the media object). These independent watermarks may be encoded in a temporal data sequence, like audio or video, by mapping each watermark to unique temporal locations.

In one implementation of layered watermarks for video, different watermark layers are embedded in discrete, interleaved time slots of the video. At each stage in the distribution of the video, the entity handling the video embeds its watermark identifier in the time slot allocated to that type of entity. Time slots may be allocated by their relative position to a temporal synchronization marker in the video, such as the calibration signal described in the previous section.

Figure 2:
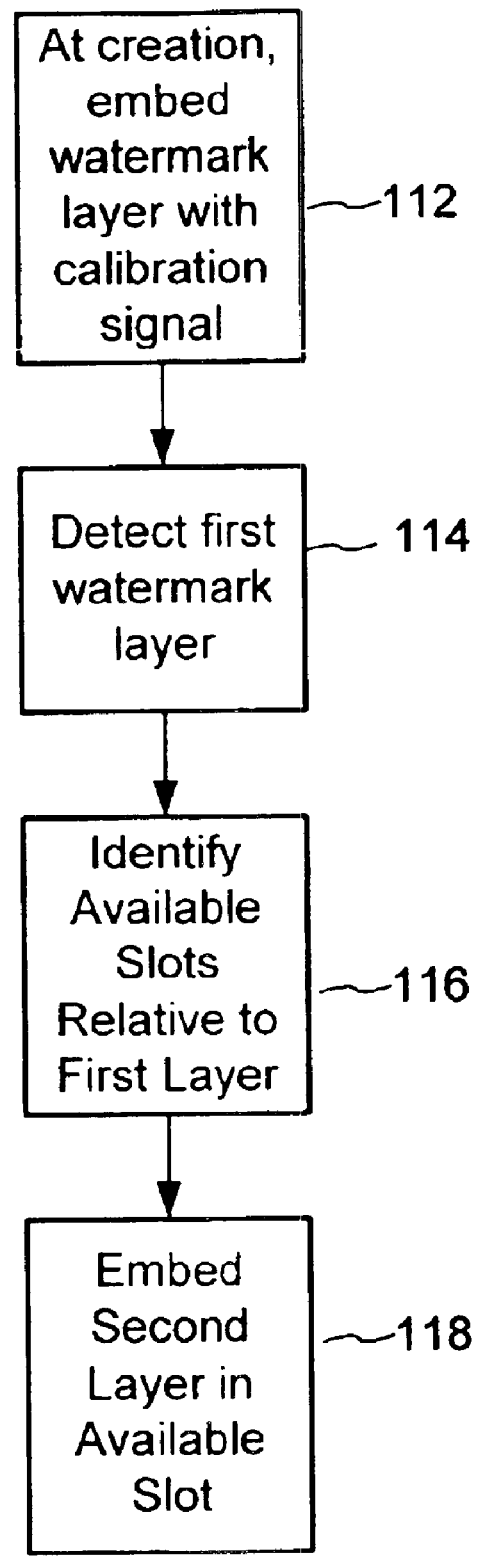
FIG. 2 is a flow diagram illustrating a method for watermark layering.

FIG. 2 is a flow diagram illustrating a method for watermark layering. Upon creation, the producer embeds a master calibration watermark along with its producer identifier watermark (112). At subsequent stages in distribution, the receiver reads the synchronization marker and then embeds its identifier watermark in the time slot allocated to it as shown in blocks 114, 116 and 118 of FIG. 2. These time slots are preferably interleaved and repeated such that every temporal unit of video or audio includes each of the desired time slots. This temporal unit of time slots is repeated throughout the audio or video track such that the watermarks in each slot can be fully decoded from partial segments of audio or video. To reduce chances that the digital watermark layers will add perceptual artifacts as more layers are embedded, the time slots are preferably spaced so as not to overlap in time.

To extract watermark layers from an arbitrary clip of the video or audio, a watermark detector first uses the calibration signal to align the watermarked signal along time slot boundaries. It then invokes a watermark reading operation on the desired time slot to extract the watermark message embedded in that time slot.

For video, temporal synchronization can be achieved by using calibration signals in video frames, such as the ones described above. The correlation of the calibration signal and a video frame provide a detection value for that frame. Other watermark detection statistics may be computed from watermark message symbol extraction for each frame, such as the percentage of known message symbols correctly decoded for that frame. The waveform of these detection statistics provides a synchronization signal that enables the detector to align the time slots. In particular, the peaks in the waveform of the detection statistics provide temporal reference points from which the time slots allocated to each watermark layer can be discerned.

To illustrate temporal synchronization, consider the following examples. In one example, the video watermark embedder repeats a first watermark signal, such as a perceptually adapted pseudo-random carrier signal over a segment of N frames. This segment may be followed by one or more open time slots without watermark layers, or segments with relatively independent watermark signals carrying different watermark layers (e.g., relatively uncorrelated watermark signal layers). Preferably, the first watermark signal segment is interleaved periodically throughout the video sequence. To detect this first watermark, the detector slides a temporal detection window of length N frames or greater over the video sequence, and sums the frames in the window. The first watermark signal adds constructively over the N frames in which it is repetitively embedded. As such, the accumulation of the frames in the window that is perfectly aligned with the N frames of the first watermark will have the strongest watermark signal. By correlating the pseudo-random carrier signal with the sum of the frames in the detection window, the detector will observe a correlation peak at the time segment where the detector is temporally synchronized with the first segment. The waveform of the correlation, thus, provides synchronization markers at the correlation peaks where the first segment exists in the video signal.

Alternatively, if a detector uses M frames, where M is less than N, the system (as the detector slides it) will remain at a maximum value while all M frames are part of the N watermarked frames. As some of the M detector frames move outside the N frames with the watermark, the correlation will reduce. When all of the M detector frames are outside the N frames, the correlation will be 0. The synchronization can be found when the correlation is 50% of the peak, knowing that the watermark ends in the middle of the M detector frames. Similarly, when the correlation first goes to 0, the N watermark frames end at the first M detector frame. In other words, the presence or absence of the key, e.g. pseudo-random sequence, provides the synchronization signal. With this method, the additional interleaved layers use a different key.

Another temporal synchronization marker can be achieved by embedding a hidden calibration signal comprised of impulse functions that have peaks in the temporal frequency domain. Like the previous example, this signal is embedded in a time segment of N contiguous frames. This type of signal is similar to the calibration signal described previously for a spatial image, yet it is encoded over a block of time. To detect the synchronization marker, the detector takes the FFT of selected pixel locations or blocks of pixel locations over a sliding detection window of N or more frames. The detector then correlates the calibration signal in the frequency domain with the FFT transform of the received video signal. The time segment with the highest correlation with the calibration signal provides a temporal synchronization marker. This separate synchronization signal can be embedded over one or more of the other interleaved layers, or interleaved with the other layers.

In some cases, N may be 1 frame, and the embedder and detector can synchronize to the watermark time segmentation by finding the frame with the special calibration signal. For example, video (e.g., recorded at 30 frames per second) can have this special calibration signal at every $90^{th}$ frame, and three (3) watermark layers, where each watermark layer contains 30 frames (i.e. 1 second of video), are embedded between the calibration signal. Of course this is but one of the many possible implementation of our inventive techniques.

In each case, the time slots for embedding different layers can be established at pre-defined time offsets, such as three layers, where each layer takes one second to embed (as described above) from the temporal synchronization marker. Other forms of time synchronization can be achieved by finding time slots at the border between frames where a watermark is detected and no watermark is detected. For example, the number of layers and time required for each layer may not be known in advance, so a watermark is embedded every 5 seconds, and other layers are added in between as necessary until the segments without watermarks are gone.

It is not necessary to use a single master synchronization signal. Different calibration signals may be used to reference different watermark layers.

Finally, for images and video, the layers may be provided spatially. In this case, each frame or image is broken into tiles, e.g., square blocks of pixels, where tiles of the image or frame include various watermark layers and/or synchronization signals, if required. Thus, each tile or each set of tiles can have a different watermark layer. When sets of tiles are used, a watermark layer is repeated throughout the image, such as in every $3^{rd}$ tile, horizontally and/or vertically.

Roles of Layers

The watermark layers may serve a number of different functions and refer to different data. Each layer may include different metadata or an identifier that points to a record in a database providing pertinent information, such as creator, distributor or recipient information. One layer may include a pointer to copyright information in a copyright database. For example, the layer may activate a link to a web site that displays information about the copyright owner. Another layer may include a pointer to metadata in an asset management database. This layer may activate a link to the metadata database to provide information about the content. Another layer may include an identifier for broadcast monitoring. A broadcast monitoring detector extracts the identifier from this layer and records a log of time/date and location of broadcast or distribution. Another layer may include an identifier that uniquely identifies a person, entity or device for forensic tracking of the content.

One or more layers may include a version identifier for version control. This version ID may be a unique version number assigned to the content item when distributed or reproduced, or a time/date stamp. Version control may also be handled by inserting a pointer to a database record with version information, such as the unique version identifier or time/date stamp.

A layer may also include an embedder or camera identifier to record the embedder device that embedded the layer or a capture device that produced the content.

Public/Private Layering

Some layers may embed public key watermarks while others embed private key watermarks. A public key refers to a watermark where the key used to extract the watermark signal is available to many devices that are expected to operate on the watermarked content. Typically, such public key watermarking is designed to operate efficiently on consumer devices such as media players and computers. A private key refers to a watermark where the key used to extract the watermark is limited to one or a few entities. Decoding of the private key watermark may be performed off-line in a more powerful computer, such as for forensic tracking applications where the watermark layer carriers a covert identifier of some device or entity associated with the content.

One application of using discrete synchronization signals for different layers is to differentiate private and public watermark layers. For example, some private watermark layers may have more covert calibration signals that are known only to the holder of the private watermark key.

Version Control and Multi-Key Identifiers

Because digital watermarks can carry hidden auxiliary identifiers within multimedia content, they provide an excellent method to identify content and its source, such as distributor. In addition, they can be used for finer grain version control.

For example, digital watermarks can identify which movie was broadcast, who broadcast it, and when was it broadcast. Digital watermarks can also identify which image was used in an advertisement, the advertiser, and the image version. Further, digital watermarks can be used to identify the audio, the retailer, and the transaction recipient.

In this section, we discuss how to use the digital watermark for version control. Version control refers to a mechanism for identifying the version of a content item, such as song, image, program or movie. Version control includes associating version information with content, including time/date of content distribution (e.g., broadcast or distribution), and time/date of a content transaction (e.g., sale, electronic purchase or license).

A digital watermark can provide version control by including a version identifier (ID) as part of its message payload. The version control may be a sequential or not. For sequential version control, the version number must be stored in a system accessible to all participants, e.g., content owner or distributor, who can update the version number or version control watermark layer, such that the version number is properly updated. Using a time date-stamp allows the newest version to be found without the need for a central version control, but can allow one piece of content to have different modifications. In other words, one piece of content can turn into two different parallel versions.

For non-sequential version control, random or transactional numbers can be used as version identifiers. In this case, the version identifier numbers are produced by a random number generator, which generates statistically unique numbers. These numbers serve as an index to a database record that provides version information. For transactional numbers, a transaction or customer account ID can be used, which is unique and provides an index to a database record that stores more information about that transaction or customer account.

The payload may also include a time-date ID for version control. A time-date ID has an advantage over sequential version control, in that there does not need to be a master database for various copies. A time-date ID has additional advantages over a sequential or random enumerative version ID since many content distribution companies keep log databases with the time and date logs, so there can be a simple one-to-one relationship between their logs and the time/date recorded in the watermark payload.

A numeric version ID or time-date ID can be embedded at the same time as the other identifiers (e.g., content ID), as one large payload, or at the same or different times as layers added on top of the other identifiers. The payloads and layers can be distributed over time and/or space for images and video to reduce visual artifacts with multiple layers. As an example with video, the broadcaster can add a time-date stamp layer at a later time on top of the content/distributor ID as version control.

Tables 1 and 2 below show examples of watermark payload structures with version control information. N, M, and K are integers, e.g., N=M=K=32.

TABLE 1

Payload with content ID, distributor ID and version number

| Content ID | Distributor ID | Version ID |
|---|---|---|
| N bits | M bits | K bits |

TABLE 2

Payload structure of Table 1 with a time-date stamp used as a version number

| Content ID | Distributor ID | Time-Date ID |
|---|---|---|
| N bits | M bits | K bits |

As shown in Table 1, the watermark payload contains a content ID, a distributor ID and a version ID. The content ID uniquely identifies the content. The distributor ID uniquely identifies the client who interacts with the content, such as a broadcaster, advertiser, online retailer, etc. The version ID is used to update the content or distributed version, which is potentially updated in a sequential fashion.

A database or set of databases relates these IDs to actual contact information. In our system, for example, one or more of these databases is accessible via an Internet client program with correct authority. For example, the client extracts the watermark payload and forwards the ID to the database over the Internet using standard TCP/IP. In response, the database looks up the content information associated with that ID in the database and returns it to the client. In this case, the content ID and distributor ID are saved in a database accessible from tho Internet, and the version ID is saved in a private database of the content owner or distributor. However, the content owner and/or distributor can upload the version ID to the central database so others can easily receive similar information. Further information about storing metadata indexed by a watermark identifier in a database accessible via the Internet is described in co-pending patent application Ser. Nos. 09/571,422, 09/563,664 (now U.S. Pat. No. 6,505,160), 09/597,209 (now U.S. Pat. No. 6,411,725) and 09/636,102, which are hereby incorporated by reference.

Public/Private Version Control and Multi-Key Examples

To clarify this method, a few exemplar embodiments are described below. The first example demonstrates the structure of IDs and related database for a movie broadcast on TV. The content ID entry in the database includes the movie title, actors, and related and new releases. The distributor ID entry in the database includes the broadcast service provider, such as cable or satellite system name, and key contact information. The version ID entry in the database contains information including the date and time of broadcast. The version ID, which may be a standalone identifier or a time-stamp, is saved in a private database owned by the distributor.

The second example demonstrates the structure of IDs and related database for an image used in an advertisement. The content ID entry in the database includes the image owner and link to the web page selling the item in the ad. The distributor ID entry in the database includes the magazine title and page number for the advertisement. The version ID entry in the database includes the version of the image for the content owner. The version ID is saved in the central database, but with access rights owned by the content owner. This allows online distributed collaboration between the content owner and advertiser. When designing the ad, the content owner and advertiser can make sure they are using the same and most current version of the image.

The third example demonstrates the structure of IDs and related database for a compressed, digital song that is sold online. The content ID entry in the database includes the artist, song title, album, music publisher, record label, and links to the each web site. The distributor ID entry in the database includes the online retailer's name and link to their web page. The version ID is the transaction number for the online retailer and relates to information in their private transaction database.

In yet another example, a watermark embedder in the media signal capture or processor device embeds a time/date stamp to identify the content, and device ID for the device. The device IDs are stored in a private database. Some examples include watermark embedders that embed the device ID in a camera as it captures a still image or video, or an audio recorder as it captures an audio signal. A similar device ID can be embedded in receivers and other media processors that handle the content. When multiple layers of device IDs are embedded, each subsequent ID embedder uses the layering approach to locate an un-watermarked area, either temporal or spatial, to insert the watermark. Preferably, this device ID is embedded using a private watermark, but the technique is applicable to both public and private watermarks. The time/date stamp may be used along with the device ID to index a database that stores metadata about the content (e.g., creator/owner, title, content descriptors, etc.), which is recorded in the database along with the time/date and device ID.

The structure of the payload is shown in Table 2, where the version ID of Table 1 is replaced by a time-date ID. The time-date ID is referenced to 12:00:01 AM (GMT) Jan. $1^{st}$, 2000 using seconds, and is sometimes also referred to as a time-date stamp.

Alternatively, a segmented time and date stamp can be used. The time stamp measures seconds since the beginning of the day, and requires 17 bits for 86400 seconds/day. The date stamp measures the day since 12:00:01 AM (GMT) Jan. 1, 2000, and uses 15 bits, which will last for 89 years. Any alternative time measurement unit or reference time and date can be used as long as the number bits are adjusted for the new references.

Referring to the examples above, the first example already uses a time-date ID for the version ID. The version database for the broadcaster is already created by the broadcaster via their logs with time and date of broadcast information, including content ID. Advantageously, watermarking with version control adds no new costs.

The second example could use a time and date stamp. In this case, the content owner would not be required to maintain the version ID in the central database since the newest version would have the most recent time and date stamp.

The third example could use a time and date stamp rather than transaction ID. This would be advantageous if the online retailer maintains transaction logs via the time and date of the transaction.

The watermark payload of Table 1 or Table 2 can be embedded in many fashions. The whole payload can be embedded at once with the payload spread out over time in audio and video or space in images and video. Each ID can be embedded as a single layer, where each layer overlaps and is spread out over time in audio and video or space in images and video.

In most cases, the content ID and distributor ID can be embedded at the same time when the content is prepared for distribution, such as sent to the broadcaster, advertising publisher, or online retail. These two IDs will be comprised of one layer. Then, the version control or time-date stamp ID will be added during the distribution, such as at time of each broadcast of the movie, each publication of the advertisement, and each sale of the song. Thus, the version or time-date stamp ID will be an additional layer. As noted above, the identifiers may be embedded using combinations of public and private watermarks, where the public watermark uses a public watermark key, and the private watermark uses a private watermark key. For example, the Owner ID is embedded with a public watermark, while the content IDs and/or time-date stamps are embedded with private watermarks. This can provide the public with copyright communication about the content owner, and the content owner with control of the released content.

Since watermarking multiple layers on top of each other can produce visible effects, each layering may want to leave some empty time or space for the next layer to use. A synchronization signal, such as discussed in this document, can be used to synchronize each layer. In particular, layers are embedded at different times and places, yet each subsequent embedder uses the synchronization signal to start embedding in a temporal or spatial location reserved for the type of payload information associated with that embedder. Thus, several layers can have the same effect impact on perceptual quality of the content as one layer added at one time.

This is especially important in version control of images for advertising. In this case, the image may not only contain the most recent time-date stamp, but previous ones. Using spatial synchronization to interleave watermark layers over the image can allow the content owner and advertiser to follow the version release dates while producing minimal visual artifacts.

Since the number of versions with time-date stamps is unknown at the beginning, an estimate will be required with this preset time interleaving, and the correct time interval will be left between layers, as has been discussed above. If the system allows for 5 versions on average, the $6^{th}$ version may have to become a second layer using a different spreading function on top of the previous 5 versions.

Alternatively, the methods described U.S. patent application Ser. No. 10/017,677, filed Dec. 13, 2001. (U.S. Patent Aplication Publicaiton 2003-0112974), which is herein incorporated by reference, can be used to enable multiple layering without predetermined time interleaving. Each method will have advantages depending upon the structure of the version control required by the application.

Such layering methods become important in news broadcasts, where news stories may contain segments from multiple content owners. As such, a news story may have many layers of watermark IDs.

The embedded identifiers and time-stamps may be used for multiple different functions by different entities. Different payloads can link to different databases. Furthermore, different identifiers or layers may use different watermark decoding keys (e.g., public or private keys) to limit access to certain types of information. For example, the content may include multiple identifiers that link to different databases, some public and some private. Also, within a single database, some of the database records or fields may be indexed via an identifier embedded with a public key watermark, and other more sensitive database records or fields may be indexed via an identifier embedded with a private key watermark. Thus, depending on the watermark detector, and its access to appropriate decoding keys, the watermark detector can access different databases, and possibly different parts (public and private data) in the same database.

For example in one application, an asset management system uses a public watermark content/distributor ID to access the appropriate database and associated metadata. Authorized detectors include the ability to decode private watermark identifiers or time-stamp data to look up information about a specific broadcast.

In another application, a public watermark carrying a camera ID embedded in a video camera at the time of capture links to public information, such as the source of the video or camera. Similarly, a private watermark carrying a private camera ID and time-stamp may be used as an identifier to link back to the asset and rights management system, for more detailed information or private information. Separately, the public or private key watermark ID is monitored in a broadcast monitoring receiver and recorded in a database as part of a broadcast monitoring report. Generally, both public and private watermark identifiers may be present in content so it can be used for multiple applications including broadcast monitoring, copyright communication, forensic tracking, asset management etc.

By appropriately layering the information between public key and private key owner, content and distributor IDs, in addition to the camera or encoder IDs and the time stamp, the size of the payload can be efficiently managed to help reduce the chance of perceptible artifacts in watermarked audio or video while enabling content to be identified to support a number of applications throughout the production and distribution/broadcast chain.

Efficient Watermark Flags

Figure 3:
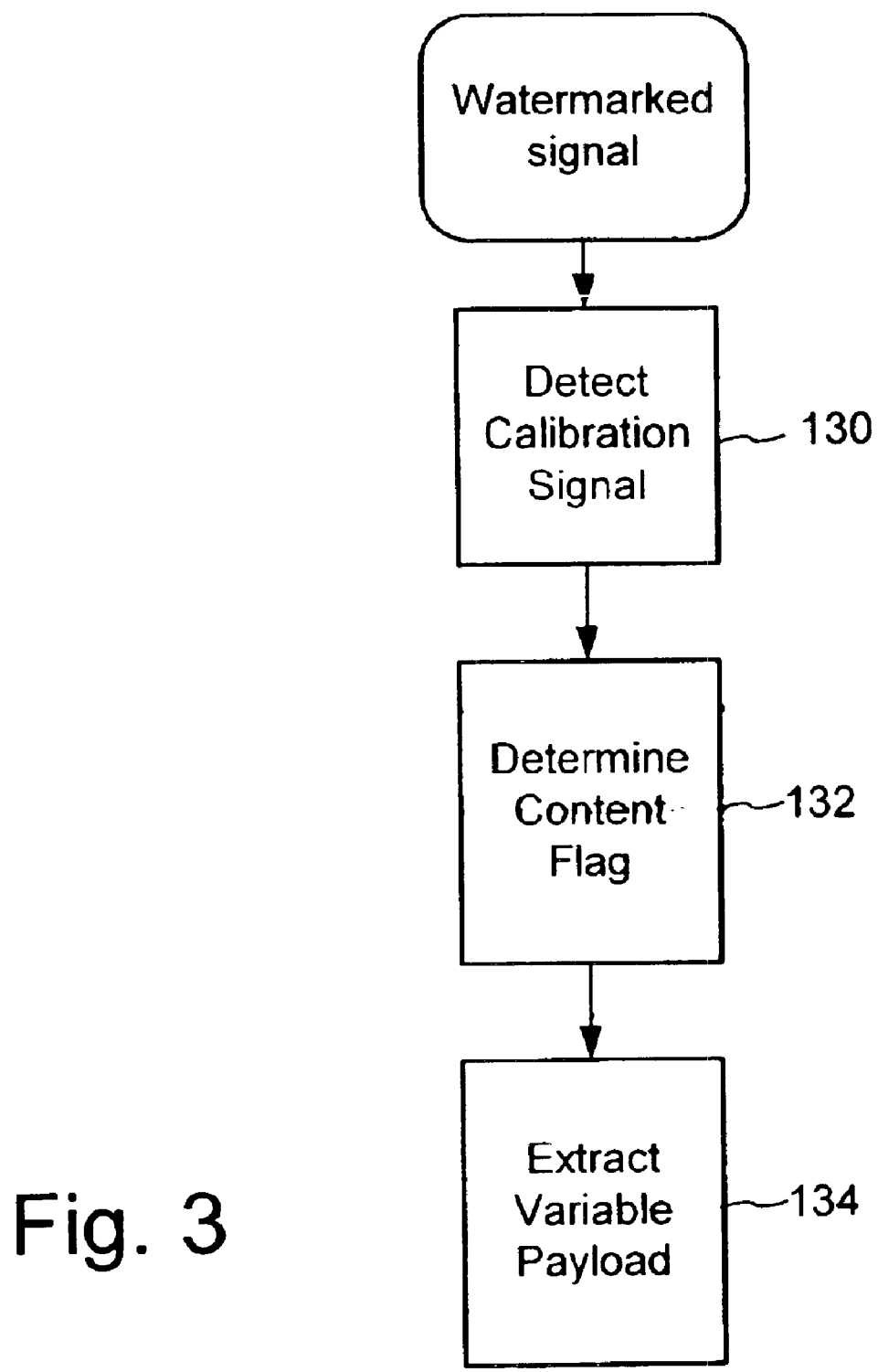
FIG. 3 is a flow diagram illustrating a method for efficiently conveying content flags in watermark calibration signals.

In some watermarking applications, it is useful to be able to perform an efficient partial decoding of a watermark message to control subsequent processing of the watermarked content without performing a complete decoding of the watermark. FIG. 3 is a flow diagram illustrating a method for efficiently conveying content flags in a calibration signal. One way to accomplish this partial decoding efficiently is to extract message symbols from the 1-D or 2-D calibration signal described in previous sections as shown in blocks 130–132 in FIG. 3. In particular, the calibration signal may be used to carry one or more message symbols that can be decoded quickly in initial watermark detection phases. For example, the presence of different calibration signals can indicate content ratings (132). Specifically, one calibration signal identifies the content as adult content while another calibration signal identifies the content as applicable to everyone. Alternatively, several calibration signals could be used for a G, PG, R, and X rating system. Similarly, different calibration signals can indicate copy control information, such as copy never, copy once, copy no more, copy freely, along with 90 minute pause, no redistribution, or 3 hour delay for redistribution flags.

As described above, one implementation of the calibration signal is an array of impulse functions in a transform domain, such as the Fourier magnitude domain. These impulse functions have pseudo-random phase. Different calibration signals representing different content flags may be constructed by selecting different subsets of impulse functions in the Fourier magnitude domain. Alternatively, different calibration signals may be constructed by selecting different phase specifications for a set of impulse functions at fixed locations in the Fourier magnitude domain.

Another way to form the impulse functions is to pattern a variable data carrying watermark in a structure that produces impulse functions or peaks in a transform domain (e.g., the convolution or autocorrelation domain). One example is a repetition of the variable data carrying watermark in blocks of pixels in the spatial domain of an image or image frame. The structuring of the watermark into different repetitive patterns forms different calibration signals corresponding to different content flags.

Subsequent watermark message symbols may be decoded after compensating for geometric and temporal distortion using the techniques described in assignee's co-pending application Ser. No. 09/503,881 (now U.S. Pat. No. 6,614, 914) and U.S. Pat. No. 6,122,403 as reflected in block 134 in FIG. 3. For example, a private or public key comprising a pseudorandom sequence coupled with a mapping function that maps elements of this sequence to positions within the host media signal can be used to extract a multi-bit message code that carries information in addition to the calibration signal.

Watermarking of Video Object Layers

In prior patent applications, we discuss video watermarking techniques involving video objects, such as MPEG-4 video object layers. See, for example, U.S. patent application Ser. No. 09/597,209 (now U.S. Pat. Nos. 6,411,725), 09/951,142 (now U.S. Patent Application Publication 2002-0076083), and 60/349,970, which are each herein incorporated by reference. In addition, U.S. Pat. Nos. 6,282,299 and 6,226,387, which are hereby incorporated by reference, describe watermarking of video objects.

These video objects comprise motion picture sequences corresponding to segmented objects from within a sequence of video frames. In some applications, moving foreground objects in a camera shot are segmented from a relatively static background object (e.g., a talking head segmented from a static background). This segmentation process yields two layers of video sequences, which are superimposed to form the complete video sequence. The MPEG-4 video compression standard allows for separate compression of these types of objects in data structures called video object layers. Each of the video object layers are independently compressed and transmitted in digital data streams called elementary bit streams.

Within this video object layer framework, we developed a video watermark embedding process to operate on MPEG-4 video content. In our system, an MPEG-4 system receiver separates an incoming digital data stream into elementary bit streams. A parser operates on each elementary bit stream of video to extract intra (I frames) and inter-frame (P and B frames) coded blocks for a video object in each frame. At this stage, a watermark embedder modifies the DCT coefficients of a partially decompressed video object to embed a watermark signal. In MPEG-4 video (as well as other video coding standards), the DCT coefficients are quantized and then entropy coded (e.g., Huffman or Arithmetic coded in a zig zag pattern starting at the lowest frequency, and zagging back in forth diagonally across the block. As such, a partially decompressed set of DCT coefficients corresponds to a sequence of DCT coefficients in this zigzag pattern.

Note that digital watermarking of compressed domain content can be performed by parsing a previously compressed bit stream and modifying selected values to embed a digital watermark, or embedding the digital watermark as part of the process of compressing the content.

One way to generate the watermark signal in the DCT domain is to take a message payload, perform error correction coding to create an error correction coded signal, spread spectrum modulate this coded signal by spreading each element over a random carrier, and map the chips of the spread spectrum modulated signal to DCT coefficients. The DCT coefficients are then quantized or otherwise adjusted up or down according to the binary values of the chip signals mapped to the coefficients. The spread spectrum signal can be weighted by perceptual gain factors computed from the spatial domain, frequency domain, and/or time domain. For example, the perceptual masking parameters may be computed and then transformed into the DCT domain, where they are used to control the extent of the modification to the DCT coefficients. Alternatively, a perceptually adapted watermark signal may be computed in the spatial domain where the chips and perceptual gain parameters map to spatial domain pixels. This spatial domain signal is then transformed to the DCT domain and used to modulate DCT coefficients.

This embed in DCT domain method is more efficient because the watermark only needs to be transformed once (as long as the payload does not change), whereas, while embedding in the spatial domain, each frame of the content needs to be decoded and re-encoded. In addition, the content has less degradation since the content is not re-compressed, but modified in the compressed domain. Finally, the detection system can detect in the DCT domain using the DCT transformed spread-spectrum key or in the spatial domain using the non-transformed (e.g., original) spread-spectrum key. The DCT or spatial method is chosen depending upon whether the watermark detector receives compressed DCT content or non-compressed spatial content, respectively.

For MPEG content, the Huffman sequences are preferably un-encoded before embedding and re-encoded after embedding. The DCT method is preferably careful not to lengthen the bit rate of the video content. Methods of keeping the bit rate constant are known in the state of the art. For example, if the length of the new VLC of an AC coefficient is longer than that of the original VLC, the original VLC for that coefficient is retained. This condition is preferred in order to not exceed the original bit rate. This normally reduces the number of altered coefficients to only about 10–20% of the total number of DCT coefficients, which implies that about 0.5–3% of the watermark is embedded. Hence, each bit must be spread over 0.5–1 million coefficients in order to compensate for this loss. This reduces the number of embedded bits to a few bytes per second. The situation can be improved if a longer section of DCT coefficients is used, such as an 8×120 slice.

As an alternative to directly modifying DCT coefficients, the embedder may modify spatial image pixels in fully decompressed video object frames. Modifying the spatial image pixels causes more of the watermark to be embedded as well as enables a more precise human visual model since the content and embedded watermark is not truncated due to the compression, at the expense of less efficient embedding.

After watermark embedding, an MPEG coder returns each watermarked video object layer to a compressed form, and ultimately into a watermarked elementary bit stream.

For watermark reading and detection, the watermark detector may be inserted in an MPEG-4 system as the same stage as the embedder. In particular, this type of detector operates on watermarked objects after they are parsed from the MPEG-4 elementary bit streams.

There are a number of watermark embedding and reading functions applicable to embedding message symbols into DCT coefficients or corresponding spatial domain pixels. Our system uses error correction coding, such as repetition and convolution coding to expand an N bit binary message to a larger M bit raw binary message. The embedder spreads each symbol in the raw message over a spread spectrum carrier sequence, namely, a pseudo-random anti-podal sequence by convolving the raw message symbol with the carrier sequence. The embedder maps the resulting chips to corresponding DCT coefficients and modulates the coefficients up or down according to the sign of the chip and a perceptual mask.

The reader synchronizes the incoming stream of DCT coefficients in an elementary bit stream by correlating them with a known watermark signal. It then extracts the message by predictive filtering the DCT coefficients to estimate whether the coefficients represent positive or negative chips. It then accumulates the chips for each bit to form a soft value indicating whether the raw message symbol estimate corresponds to a binary one or zero and the confidence of that value. A convolution decoder then performs error correction decoding to extract the original message.

The video watermark can be embedded such that it survives decompression, Digital to Analog, and Analog to Digital conversion. Preferably in this case, each video object should include the same digital watermark and should be synchronized such that the video watermarks in overlapping video objects do not interfere with each other. In this case, the watermark detector and reader operate on either raw digital video sampled from an analog video stream or on the partially decompressed bit stream as described above.

In a related extension of this method, digital watermarks may be embedded and extracted from a form of video object called a "sprite." In the context of object-based video coding, the term sprite refers to a coding format for representing a video object in a video sequence. This representation includes a composite object that represents the object for all frames in the sequence. It may have a regular or irregular shape (e.g., rectangular and frame-sized, or non-rectangular, but padded to form an integer multiple of 8 by 8 pixel blocks called "macroblocks"). The composite object is comprised of pixels, which are divided into macroblocks and compressed like I frame blocks in MPEG-4 video object layers. The sprite also includes affine transform parameters for each block describing the geometric warping of that block for a particular frame in the sequence. Finally, the sprite may include one or more error frames that comprise the difference between the warped composite object and the original object for a given frame. These error frames are compressed in a similar fashion as P frames in MPEG-4. These error frames are used to compensate for the difference between the predicted object and the original object.

In the case where the watermark enabled MPEG-4 system receives an elementary bit stream that represents a sprite, it parses the composite object of the sprite and embeds the watermark into the partially decompressed, or fully decompressed pixels (e.g., DCT coefficients, or spatial domain pixels).

When a goal of the embedder is to embed the viewed image with a watermark, each sprite is watermarked based upon a master calibration and data-carrying signal. As such, when the final viewed signal consisting of a group of sprites is viewed, the watermark is continuously embedded throughout the complete frame. This is useful in the application of forensic tracking, where an account, device or player ID is embedded in the viewed content to enable tracing of the content back to the view if the content is illegally re-distributed (with concerns for privacy properly handled).

When the goal of the embedder is to embed different objects with different payloads, each video object layer may include its own calibration signal. However, it is possible to have one object carry a master calibration signal, which is then used to calibrate the other video object layers, and the master payload can contain location information to identify each sprite (e.g., as discussed in U.S. patent application Ser. No. 09/597,209, filed Jun. 20, 2000, (now U.S. Pat. No. 6,411,725), which is herein incorporated by reference). Alternatively, each sprite could contain part of the watermark message and/or calibration signal, such that the final image/frame contains as complete as possible watermark message and/or calibration signal.

Separate calibration signals per object layer are particularly useful in cases where those layers carry different watermark message payloads. This enables the detector to detect and synchronize the different watermarks in objects of a video sequence that has been converted to the analog domain.

This is useful in connected content or e-commerce applications, where each sprite may optimal have a different link. For example, in a movie scene with a car on a beach, the content owner may want the car to link to a car dealership and the beach to link to a vacation resort so that the viewer can purchase the car or book the vacation from the movie.

Compression Domain Watermarking Using Selective Prediction

In some video applications, it is useful to be able to extract a watermark from the compressed bit stream without resorting to de-compression operations. In this section, we describe a technique for embedding a watermark in the video compression process. This technique embeds a watermark that enables the detector to operate completely in the compressed domain.

Linnartz has proposed a method form video watermarking in the compressed domain of MPEG video. In Linnartz's approach, a watermark embedder operates within the MPEG encoder, selecting a sequence of I, B, and P frames in a pattern corresponding to watermark message symbols to be embedded in the compressed video stream.

To understand Linnartz's approach and our alternative approach, it is helpful to review the MPEG video compression process. To achieve efficient data compression, MPEG uses three different Picture Types. Each frame is decoded as an I, B or P type. The I-frame is fully self-contained in the sense that when decompressed, the luminance and chrominance values of each pixel can be uniquely determined and recovered. P-frames however, are differentially encoded and the most recent previous I or P frame is treated as a reference during decompression.

Figure 4:
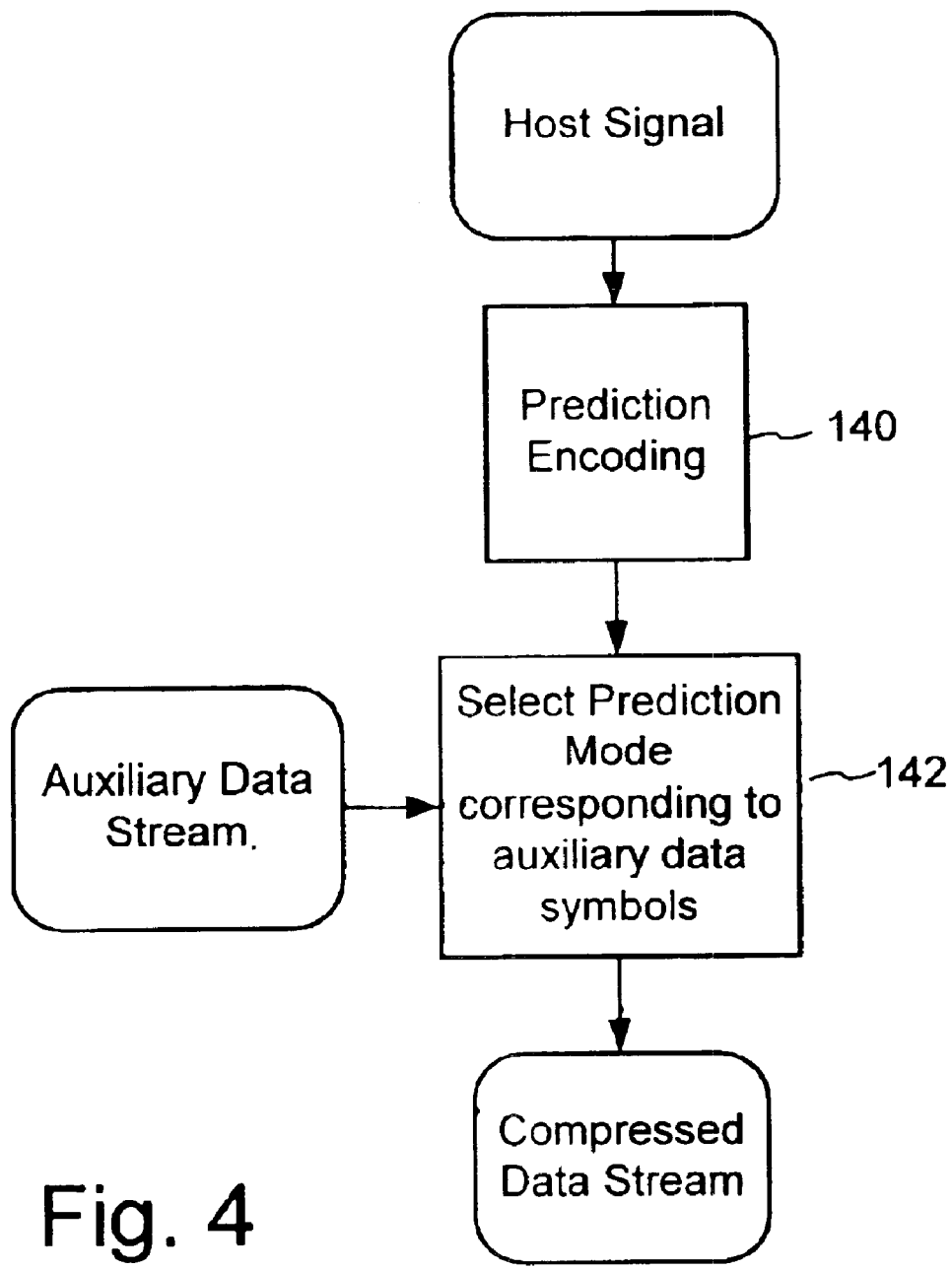
FIG. 4 is a diagram illustrating a method for compressed domain embedding.

FIG. 4 is a diagram illustrating a method for compressed domain embedding. In this method, the system embeds the watermark by selecting the direction of prediction for B-frames according to a desired watermark signal as shown in blocks 140 and 142. In B-Frames, a macroblock can be predicted from the previous, next, or the previous and the next I or P frames. The MPEG encoder normally selects a suitable prediction method (forward, backward, or bi-directional) for every macroblock such that the overall compression ratio is optimized. By sacrificing some compression efficiency, the MPEG encoder can be made to select the prediction method according to the watermark payload. If the payload is expressed in a trinary system (0,1,2), then, for a trinary 0 the MPEG encoder would select backward prediction, for a trinary 1, it would select forward prediction, and for a trinary 2 it would select a bi-directional prediction.

This technique allows high payload (about 0.5 Kbits/frame; i.e., 15 Kbits/second), since it does not require spread spectrum or error correction bits.

For certain types of video compression standards, such as MPEG-4, there are a number of different prediction modes for B frame coding. These modes include direct, frame forward, frame backward, frame bi-directional, field forward, field frame, and field bi-directional. These modes can be selected during compression to convey auxiliary data.

Efficient and Robust Watermark Detection in Compressed Video Streams

Some applications require that a digital watermark be efficiently decoded from a compressed video stream, yet survive decompression and other forms of processing. As such, it is advantageous to design a watermark that is both robust and efficiently decodable from a compressed stream.

Spread spectrum digital watermarks can provide the desired robustness, yet often require at least partial decoding of the compressed bit stream to extract the watermark signal. In our implementation, a robust watermark encoder embeds a message comprised of binary symbols by spreading each of the message symbols over a pseudo-random carrier sequence (e.g., by XOR, or multiplication) to produce a pseudo-random chip sequence. It then maps the resulting chips to corresponding image samples, and in particular, spatial domain luminance samples. A mapping mask for each message symbol specifies the corresponding spatial pixel locations of the chips corresponding to that symbol.

The encoder adjusts each of the corresponding samples in the host video signal according to the following embedding function:

$$X_{watermarked} = X_{original} + gW;$$

where X is the host signal sample, g is perceptual gain factor derived from perceptual modeling of the host signal, and W is the corresponding element in the chip sequence. A variety of spatial, frequency and time domain perceptual modeling techniques may be used to compute g as set forth in the patent documents incorporated by reference.

One way to decode this watermark from a compressed video sequence is to fully decompress the stream into uncompressed video frames and extract estimates of the embedded message symbols from the image frames. This process includes an inverse DCT transformation, and a spread spectrum demodulation of the chips corresponding to each watermark message symbol.

Figure 5:
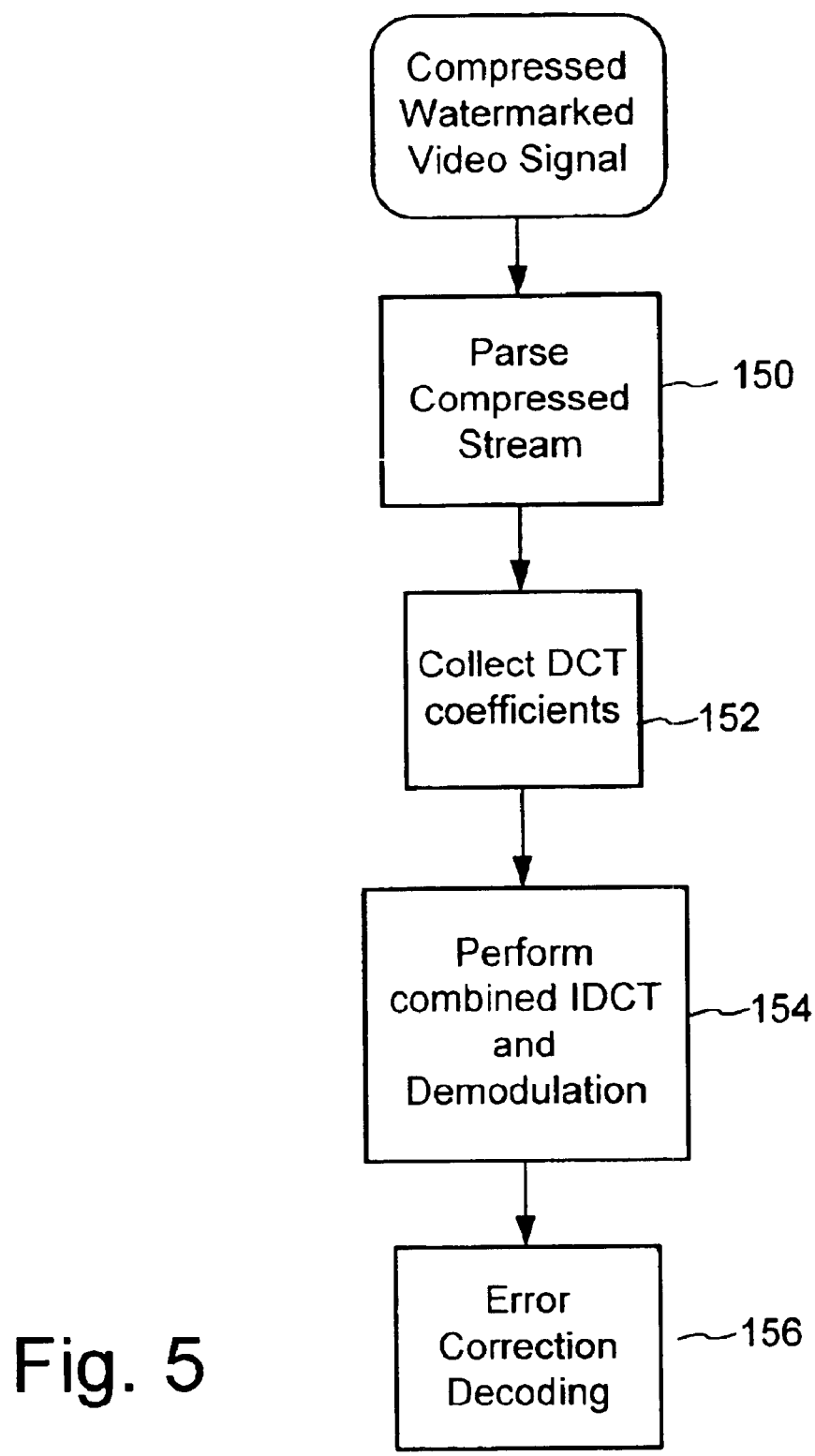
FIG. 5 is a diagram illustrating a method of detecting a digital watermark in a compressed signal that combines inverse DCT transformation and watermark demodulation.

A more efficient approach is to combine the inverse DCT transformation and the demodulation operation into one transformation that directly provides an estimate of the embedded message symbols as shown FIG. 5. The inverse DCT and demodulation operation can be combined into one matrix transformation because they are both linear operations. The inverse DCT operation is a linear operation. Additionally, the demodulation operation is a linear correlation operation (e.g., dot product). For each message symbol, the linear correlation operation multiplies a selected set of spatial domain pixels specified in the mapping mask by corresponding values in the pseudo-random spreading sequence and sums the resulting product. Since both the inverse DCT and the demodulator operation are linear transformation matrices, they are combined into a single watermark decoder matrix transformation that performs both operations simultaneously.

Each of the macroblocks in a compressed video stream in the MPEG format includes the DCT coefficients for an 8 by 8 block of watermarked luminance values. To decode the watermark, the detector parses the MPEG stream and collects the DCT coefficients from a frame as shown in blocks 150 and 152. It then performs a single matrix transformation that combines the IDCT and accumulator to get soft estimates of each message symbol as shown in block 154. These soft estimates are then input to an error correction decoder as shown in block 156.

To illustrate the operation of the decoder, consider the following example watermark protocol as shown in FIG. 5. In this protocol, the watermark signal is distributed in a watermark block comprising contiguous 8 by 8 pixel blocks in rows and columns. This watermark block is tiled across each video frame. Before applying the watermark decoding matrix, the MPEG parser collects the 8 by 8 pixel blocks corresponding to each watermark block. To improve the watermark signal to noise ratio, blocks of DCT coefficients carrying the same watermark signal may be summed such that the watermark signal adds constructively, and the host video signal adds destructively. The detector then applies the decoding matrix to the watermark block of DCT coefficients. For each binary symbol, the matrix produces a soft value ranging from −N to N (where N is the number of chips per symbol) representing the degree to which the message symbol estimate corresponds to a binary 0 or 1, respectively. This soft value is then input to an error correction decoder to extract a message payload.

In some applications, geometric distortions such as aspect ratio changes or rotation alter the geometric orientation of the watermark. To counteract this distortion, the watermark may include a calibration signal. This calibration signal may be implemented as a set of impulse functions in the Fourier domain or in the autocorrelation domain, for example. The calibration signal may be inserted at mutually exclusive spatial pixel locations relative to the message signal in each frame. Alternatively, it may spatially overlap the message signal. The calibration signals described above are one possible example. Alternatively, the carrier signal used in the spread spectrum modulator may form a pattern that creates peaks in the Fourier or autocorrelation domain when the watermark signal is tiled across an image frame. These peaks can be used to determine rotation and scale in a similar manner as the calibration signals described previously.

In these applications, the detector includes a geometric synchronizer that determines the proper alignment of the blocks. The alignment parameters are represented as an affine transform. This detector applies this transform to the DCT blocks before applying the decoding matrix.

Multi-resolution Watermark Embedding for Scalable Video and Audio

Some video applications transmit video at different spatial or temporal resolutions based on the available bandwidth and/or processing power of the receiving device. This presents a challenge for some digital watermarking protocols, which may not enable watermark message recovery at these different resolutions.

One solution is to embed the watermark signal at different spatial and temporal resolutions. Consider the example of a spread spectrum watermark signal described previously where chips are mapped to locations within the host signal. The sample or samples at these locations are adjusted up or down depending on the binary value of the chip. To embed at different spatial resolutions within a video frame, the chip for low resolution embedding maps to a N by N block of samples at a first resolution, and the chip for the higher resolution embedding maps to a single sample at the first resolution. This can be extended to one or more other spatial resolutions, limited of course by perceptual quality constraints, watermark message capacity of the host, and robustness constraints.

The same approach can be extended to the time dimension for video by mapping a chip to a three dimensional cube of samples. The spatial dimensions within a frame provide two-dimensions as above, and the time dimension (e.g., contiguous frames of video) provide the third dimension.

While a synchronization signal is useful for some applications (e.g., the calibration signals described in this document), it is not required in all applications using this multi-resolution approach to watermark embedding. This is particularly true when the content is expected to be distributed at one of a set of discrete resolutions without other forms of geometric or temporal distortion.

Fingerprinting Methods

Fingerprinting is a method of identifying multimedia content by deriving a number or set of numbers that uniquely identify that content. The fingerprint may be fragile, such as a secure hash (e.g., SHA, MD5, etc.) or robust. In the case of a robust fingerprint, the fingerprint is expected to remain relatively the same despite processing distortion due to broadcasting, compression, geometrical distortion, etc.

Figure 6:
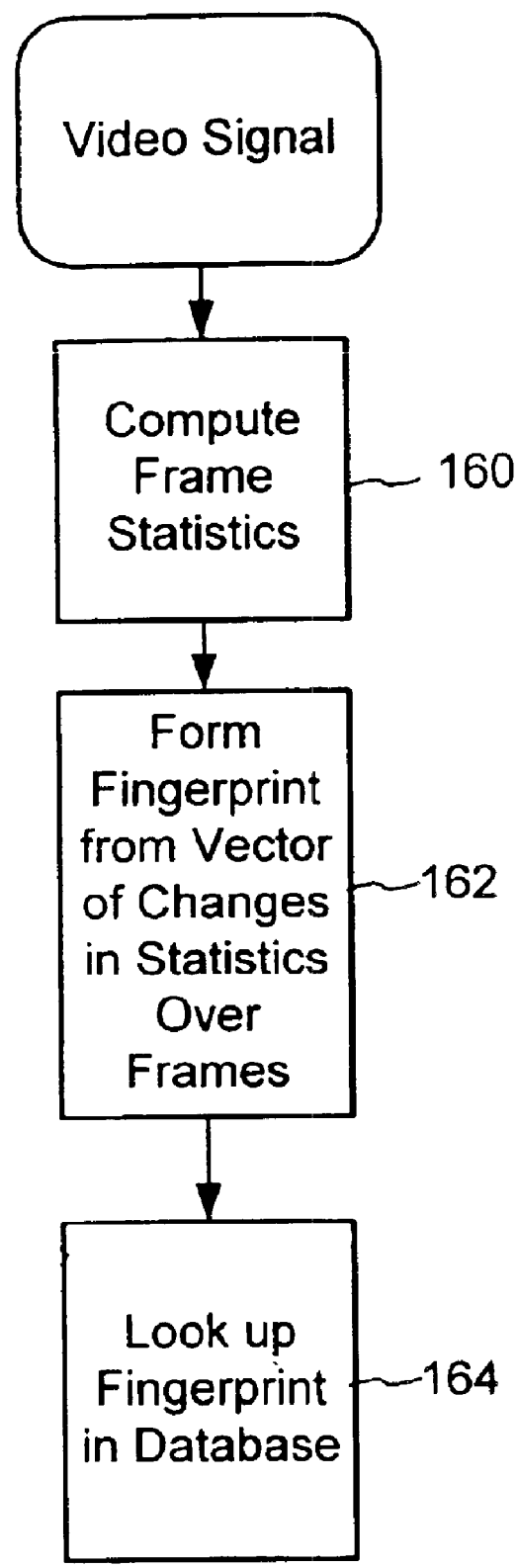
FIG. 6 is a diagram illustrating a robust video fingerprinting method.

One form of robust hash for video is a waveform constructed from statistics of each frame in the video as shown in FIG. Blocks 160 and 162 in FIG. 6. These statistics can be representing compactly as a vector of the changes in the statistic from frame to frame in a video sequence, such as a Group of Pictures (GOP) in a video coding format like MPEG. Examples of the statistics that can be used for the fingerprint include the frame average for luminance and the variance. For compressed streams, fingerprints can be extracted from the compressed data, such as the DCT coefficients in the I-frames, the motion vectors, etc.

Applications using Fingerprints and Watermarks

While fingerprints provide advantages over watermarks in some cases, they can be ineffective and inefficient in uniquely identifying content, particularly if they are computed from arbitrary clips of video or audio, or the video or audio has undergone processing distortions. One solution to this problem is to combine the use of a digital watermark and a fingerprint. In particular, the digital watermark can be used to provide a calibration signal, which is used to align the content before the fingerprint is computed. The use of fingerprints and watermarks is also discussed in U.S. patent application Ser. No. 10/027,783 entitled "Methods, Apparatus And Programs For Generating And Utilizing Content Signatures," filed Dec. 19, 2001, (now U.S. Patent Applicaiton Publication 2002-0126872) and Ser. No. 60/257,822, filed Dec. 21, 2000.

Calibration signals useful for this application are described in this document as well as those incorporated by reference.

The calibration signal reduces the number of fingerprints that need to be maintained per content title in the fingerprint database. As such, the database is less complex and look up operations to match a fingerprint with associated content information or actions are more efficient. The fingerprint database can be used to link content items with a variety of metadata and actions, such as linking the content item to a web page at a particular URL (e.g., block 164, FIG. 6).

In one application, for example, a client device receives a video stream (or image file or audio file) and detects the watermark calibration signal. It then uses the calibration signal to align the data before computing the fingerprint. It then computes the fingerprint as a vector of the frame statistics and sends it to a server that manages the database. The server looks up a corresponding fingerprint in the database and then finds the URL associated with that database entry. The server then returns the URL to the client, which fetches the web page or other program/resources at that URL.

Non-Invasive Video Watermark Control System

In a studio or other video production environment, video can be maintained is a very large format called SMPTE RP-75 (YCbCrK 4:4:4:4). This allows editors and animators the ability to add graphics and animation to the video data without corrupting the original video data. This is performed using an alpha channel and "keying" over, behind or between video layers.

Figure 7:
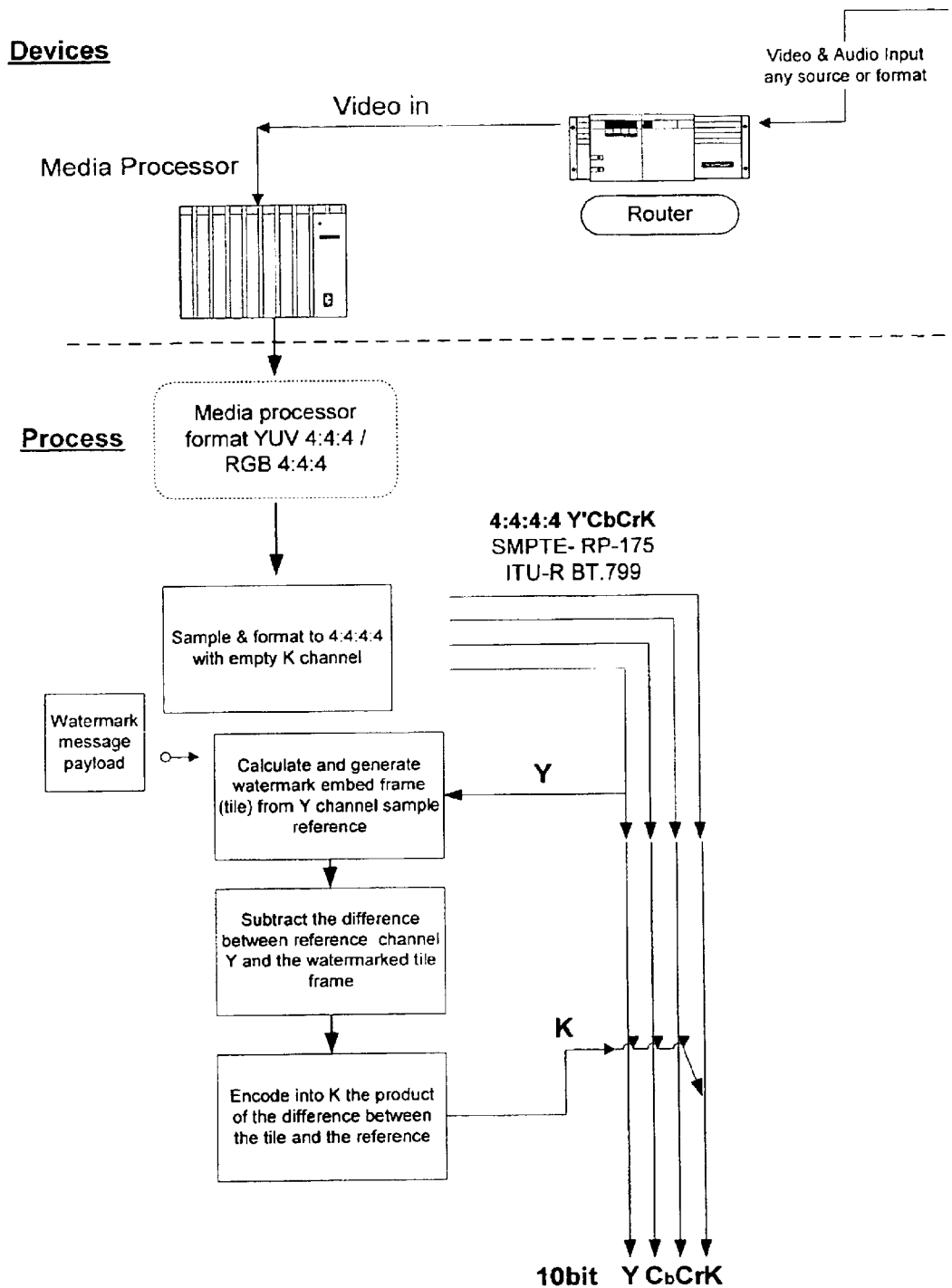
FIG. 7 is a diagram of a digital watermark embedder for video.

FIG. 7 shows how a watermark embedder takes a sample of video, creates a watermark tile the size of the sample (e.g., a sample video block of N by N pixels in a frame), subtracts the sample from the reference and encodes the "difference bits" into the additive key channel of our SMPTE RP-75 data stream. The embedder repeats this process on contiguous tiles within each frame to create watermark tiles that are adapted to counterpart tiles in the video signal.

Because all channels of this format have the same bandwidth, it is reasonable to suspect that the 'K' channel would not be filtered (e.g., "cleaned up") down stream. Some systems do what is called 'rounding and limiting' to fix ringing effects of additive video sources. This may introduce distortion in the digital watermark signal, but may be counteracted by increasing the robustness of the watermark use message coding techniques such as spread spectrum embedding and error correction coding as described in this document.

FIG. 7 represents a process to add watermark data to a 10 bit 4:4:4:4 digital video sample. The embedder calculates and creates a watermark tile object from luminance data of the Y channel. The luminance data is used to compute a perceptual mask for the watermark signal. The K channel is then encoded with the product of 'changed bits' when the reference frame from Y is subtracted from the embedded tile frame.

During print to tape or print to transmit the K channel can be mixed into the video stream via normal key combiner circuitry.

While source material is in a production format like 4:4:4:4, the original video quality is not altered by the video watermarking operation.

If a change of payload is needed. Only the enriched K channel needs to be replaced.

In the system shown in FIG. 7, the application of the embedding process is performed when the video is "print-to-tape" or "print-to-broadcast" by adding the watermark signal stored in the K channel with the key channel combiner. The watermark is not added until the delivery of the video to an output function. To regulate the watermarked video, a watermark reader is integrated into or following the output function. This "output" watermark reader gives the operator or some automated watch-dog function a method to bring up or bring down the gain on the key channel being mixed into the final output stream.

During the creation of the watermark tile, many cloned copies with differing payloads could be encoded into separate 'key channel' reference. This would allow for several exact copies of video output source with differing payloads.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of digitally watermarking a media signal with watermark layers at different times, the method comprising:
   receiving a host media signal;
   analyzing the host signal for presence of an embedded digital watermark;
   based on analyzing the host signal, identifying embedded portions of the host media signal that carry at least a first layer of an embedded digital watermark and available portions that do not carry an embedded digital watermark, the first layer of the embedded digital watermark including an index to a first database; and
   embedding a second or subsequent layer of an embedded digital watermark in the available portions, the second or subsequent layer of the embedded digital watermark including an index to a second database, different form the first database.

2. The method of claim 1 wherein the first layer includes a calibration digital watermark, and the available portions are identified relative to reference locations provided by the calibration signal watermark.

3. The method of claim 1 wherein the analyzing includes:
   sliding a detection window over the host media signal; and performing digital watermark detection repeatedly in the sliding detection window to measure detection statistics at locations throughout the host signal;
   wherein the identifying of available portions includes identifying locations where the detection statistics indicate absence of an embedded digital watermark.

4. The method of claim 3 wherein the detection statistics comprise correlation statistics, and correlation peaks in the correlation statistics provide a reference for identifying available portions in the host signal.

5. The method of claim 3 wherein the detection statistics comprise a measure of message symbol accuracy in an embedded digital watermark.

6. The method of claim 3 wherein the digital watermark detection includes performing detection using two or more pseudorandom keys, each key corresponding to a digital watermark layer.

7. The method of claim 1 wherein the second or subsequent layer carries an embedded version identifier.

8. The method of claim 7 wherein the version identifier comprises a time-date stamp embedded in a digital watermark.

9. The method of claim 7 wherein the version identifier comprises a sequential number selected from a number sequence, wherein subsequent versions of the host signal are assigned sequential numbers from the number sequence.

10. The method of claim 1 wherein the host signal includes a layer carrying a public watermark; and another layer carrying a private watermark.

11. The method of claim 10 wherein the private watermark conveys a device identifier to trace the host media signal to a particular device.

12. The method of claim 10 wherein the private watermark indexes private information in a database, and the public watermark indexes public information in the database.

13. A tangible medium on which is stored instructions for performing the method of clam 1.

14. A method of digitally watermarking a media signal with watermark layers at different times, the method comprising:

receiving a host media signal;

analyzing the host signal for presence of an embedded digital watermark;

based on analyzing the host signal, identifying embedded portions of the host media signal that carry at least a first layer of an embedded digital watermark and available portions that do not carry an embedded digital watermark; and embedding a second or subsequent layer of an embedded digital watermark in the available portions; wherein the second or subsequent layer carries an embedded version identifier; and the version identifier indexes version information in a database.

15. A method of digitally watermarking a media signal with watermark layers at different times, the method comprising:

receiving a host media signal;

analyzing the host signal for presence of an embedded digital watermark;

based on analyzing the host signal, identifying embedded portions of the host media signal that carry at least a first layer of an embedded digital watermark and available portions that do not carry an embedded digital watermark; and embedding a second or subsequent layer of an embedded digital watermark in the available portions; wherein the host signal includes a layer carrying a public watermark; and another layer carrying a private watermark; and the public watermark indexes a public database, and the private watermark indexes a private database.

16. The method of claim 10 wherein the public watermark provides copyright communication information, and the private watermark provides content identification information.

17. A method of version control of media signals using digital watermarking, the method comprising:

embedding a first watermark layer in a media signal conveying a content identifier; and as new versions of the media signal are created, embedding a second or subsequent watermark layer including a version identifier to distinguish between versions of the media signal having the same content identifier, the first and second layers including references to different databases with different access rights.

18. The method of claim 17 wherein the version identifier comprises a time-date stamp embedded in a digital watermark.

19. The method of claim 17 wherein the version identifier comprises a sequential number selected from a number sequence, wherein subsequent versions of the host signal are assigned sequential numbers from the number sequence.

* * * * *